United States Patent
Takabayashi

(10) Patent No.: US 8,627,400 B2
(45) Date of Patent: Jan. 7, 2014

(54) MOVING IMAGE REPRODUCING APPARATUS AND CONTROL METHOD OF MOVING IMAGE REPRODUCING APPARATUS

(75) Inventor: Shiki Takabayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1301 days.

(21) Appl. No.: 12/144,169

(22) Filed: Jun. 23, 2008

(65) Prior Publication Data

US 2009/0021642 A1   Jan. 22, 2009

(30) Foreign Application Priority Data

Jul. 19, 2007   (JP) ................................. 2007-188205

(51) Int. Cl.
*H04N 7/16* (2011.01)

(52) U.S. Cl.
USPC ................. 725/139; 725/39; 725/40; 725/14; 348/565

(58) Field of Classification Search
USPC .......................... 348/565; 725/14, 39–40, 139
See application file for complete search history.

(56) References Cited

U.S. PATENT DOCUMENTS

| 7,400,364 B2 * | 7/2008 | Chen et al. ..................... 348/731 |
| 2005/0086688 A1 * | 4/2005 | Omoigui ........................ 725/35 |

FOREIGN PATENT DOCUMENTS

| JP | 2006-352208 | 12/2006 |
| JP | 2006352208 A * | 12/2006 |

* cited by examiner

*Primary Examiner* — Kunal Langhnoja
(74) *Attorney, Agent, or Firm* — Fitzpatrick, Cella, Harper & Scinto

(57) ABSTRACT

A moving image reproducing apparatus that does not inform the occurrence of any high light scene when high light scenes occur respectively in the images displayed in a main picture and a sub picture, and a control method of the moving image reproducing apparatus are provided. It can be determined whether the image displayed in the main picture is the high light scene or not when the image displayed in the sub picture is the high light scene, by detecting the high light scenes displayed respectively in the main picture and the sub picture. If the image displayed in the main picture is also the high light scene when the image displayed in the sub picture becomes the high light scene, then the control of not informing a viewer of the occurrence of the high light scene of the image displayed in the sub picture is performed.

20 Claims, 9 Drawing Sheets

MOVING IMAGE REPRODUCING APPARATUS AND CONTROL METHOD OF MOVING IMAGE REPRODUCING APPARATUS

BACKGROUND OF THE INVENTION

1. Field of the Invention

The present invention relates to a moving image reproducing apparatus having a picture-in-picture function of superimposing a sub picture on a main picture to display a plurality of moving images at the same time.

2. Description of the Related Art

Conventionally, a moving image reproducing apparatus displaying a plurality of images has realized two-picture simultaneous reproduction by displaying any of the plurality of images as a main picture and another image other than the main image as a sub picture. The display function is called as a picture-in-picture function. Generally, the picture-in-picture function reduces the sub picture to a predetermined size to arrange the sub picture at a predetermined position in the display area of the main picture so that the whole of the sub picture may be included in the display area of the main picture.

This is the reason why the sub picture is small. However, even if a high light scene in an image is displayed as the sub picture, there is the possibility of missing the high light scene. In order to prevent this problem, a system which uses a high light detecting method of a sub picture to prompt a viewer to view a high light scene when the high light scene is detected was proposed.

For example, Japanese Patent Application Laid-Open No. 2006-352208 discloses a method of detecting a high light scene on the basis of the volume of a sound corresponding to the image of a sub picture and metadata to recognize a high light scene when the volume exceeds a predetermined threshold value. Then, the technique displays a mark to inform the occurrence of the high light scene on the image displayed as the sub picture.

Even if when the image displayed as a main picture is a high light scene, the method disclosed in Japanese Patent Application Laid-Open No. 2006-352208 detects a high light scene in an image displayed as the sub picture, this method displays the information indicating the occurrence of the high light scene. Because the image that a viewer wants to see most is naturally the image of the main picture, the information indicating the occurrence of the high light scene in the image displayed as the sub picture is not necessary for the viewer in the situation mentioned above, and such unnecessary display in the image is troublesome.

SUMMARY OF THE INVENTION

It is an aspect of the invention to provide a moving image reproducing apparatus that does not inform the occurrence of a high light scene when high light scenes are generated in both of the image displayed as a main picture and the image displayed as a sub picture, and a control method of the moving image reproducing apparatus. Thereby, the troublesomeness of a viewer caused by the display indicating the occurrence of a high light scene in an image displayed in the sub picture during viewing an important scene as the main picture can be decreased.

According to an aspect of the present invention, a moving image reproducing apparatus capable of displaying a plurality of moving images at the same time in a manner of picture-in-picture display in which a main picture and a sub picture are superimposed, the apparatus comprising: a detection unit that detects a high light scene from images displayed respectively in the main picture and the sub picture; a setting unit that sets whether to execute the detection of the high light scene from the images displayed respectively in both of the main picture and the sub picture or not; an informing unit that informs a viewer of occurrence of the high light scene if the image displayed in the sub picture is the high light scene; and a control unit that controls the informing unit not to inform the occurrence of the high light scene if the image displayed in the main picture is the high light scene and, at the same time, when the image displayed in the sub picture is also the high light scene in a case where the setting unit is set as detect the high light scenes from the images displayed respectively in the main picture and the sub picture.

According to another aspect, a control method of a moving image reproducing apparatus capable of displaying a plurality of moving images at the same time in a manner of picture-in-picture display in which a main picture and a sub picture are superimposed, the method comprising the steps of: detecting a high light scene from images displayed respectively in the main picture and the sub picture; setting whether to execute the detecting of the high light scene from the images displayed respectively in the main picture and the sub picture or not; informing a viewer of occurrence of the high light scene if the image displayed in the sub picture is the high light scene; and controlling the informing step not to inform the occurrence of the high light scene if the image displayed in the main picture is the high light scene and at the same time the image displayed in the sub picture is also the high light scene in a case of the setting step sets detection of the high light scenes of the images displayed respectively in the main picture and the sub picture.

According to another aspect, a moving image reproducing apparatus capable of displaying a plurality of moving images at the same time in a manner of picture-in-picture display in which a main picture and a sub picture are superimposed, the apparatus comprising: a setting unit that selects a of detection methods of high light scenes of the images displayed respectively in the main picture and the sub picture from among a plurality of detection methods to set a plurality of selected detection methods as the detection methods of the high light scenes of the respective main picture and sub picture, the setting unit being arranged to set a degree of importance for high light scene detection to each of the plurality of detection methods set to the respective main picture and sub picture; an informing unit that informs a viewer of occurrence of a high light scene if the image displayed in the sub picture is the high light scene; and a control unit that if the image displayed in the main picture is the high light scene and at the same time the image displayed in the sub picture is the high light scene, compares a degree of importance set to the detection method which is set to the main picture and detects the image displayed in the main picture as the high light scene, with a degree of importance set to the detection method which is set to the sub picture and detects the image displayed in the sub picture as the high light scene, and controls the informing unit not to inform the occurrence of the high light scene if the degree of importance corresponding to the main picture is higher than the degree of importance corresponding to the sub picture.

According to another aspect, a control method of a moving image reproducing apparatus capable of displaying a plurality of moving images at the same time in a manner of picture-in-picture display in which a main picture and a sub picture are superimpose, the method comprising the steps of: selecting a detection method of a high light scenes of the images displayed respectively in the main picture and the sub picture from among a plurality of detection methods to set a plurality of selected detection methods as the detection methods of the high light scenes of the respective main picture and sub picture, the setting step being arranged to set a degree of importance for high light scene detection to each of the plurality of detection methods set to the respective main picture and sub picture; informing a viewer of occurrence of a high light scene if the image displayed in the sub picture is the high light scene; and if the image displayed in the main picture is the high light scene and at the same time the image displayed in the sub picture is the high light scene, comparing a degree of importance set to the detection method which is set to the main picture and detects the image displayed in the main picture as the high light scene, with a degree of importance set to the detection method which is set to the sub picture and detects the image displayed in the sub picture as the high light scene, and controlling the informing step not to inform the occurrence of the high light scene if the degree of importance corresponding to the main picture is higher than the degree of importance corresponding to the sub picture.

Further features and aspects of the present invention will become apparent from the following detailed description of exemplary embodiments with reference to the attached drawings.

DESCRIPTION OF THE EMBODIMENTS

Exemplary embodiments of the present invention will now be described in accordance with the accompanying drawings.

First Embodiment

Figure 1:
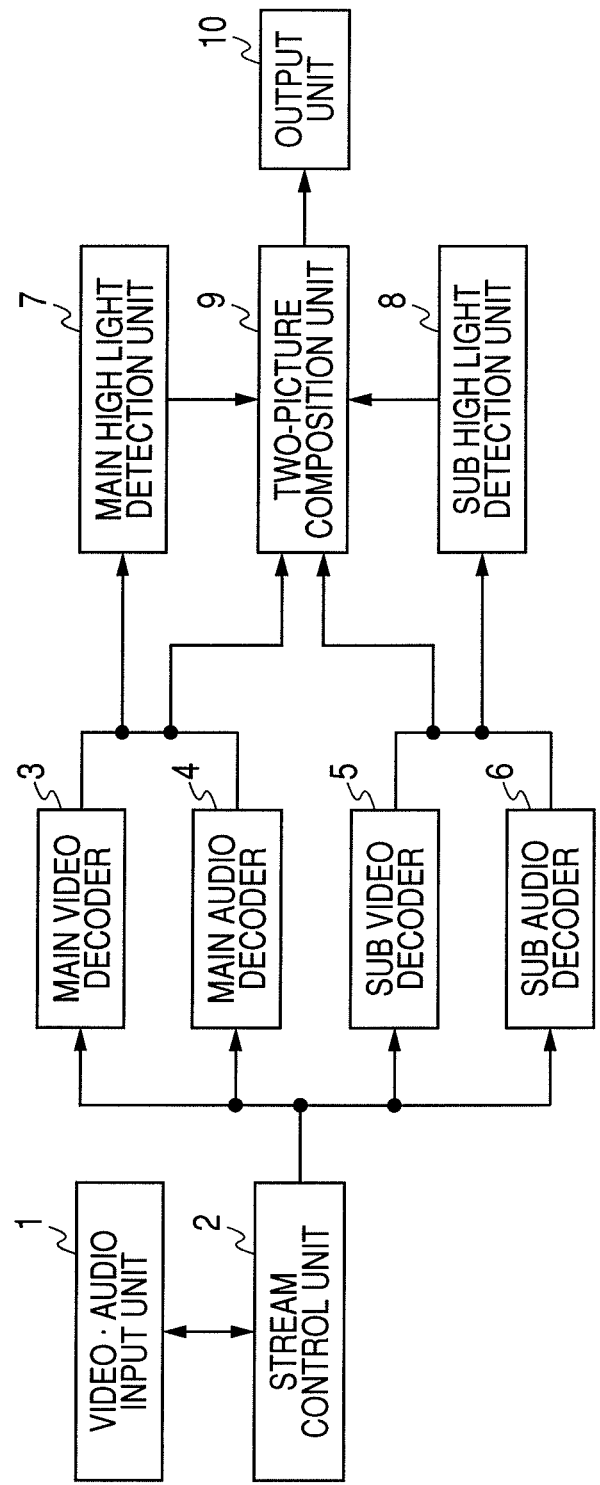
FIG. 1 is a block diagram illustrating a first embodiment of a moving image reproducing apparatus according to the present invention.

FIG. 1 is a block diagram illustrating a first embodiment of a moving image reproducing apparatus according to the present invention. Incidentally, in the present embodiment, a moving image reproducing apparatus such as a DVD player/recorder is described as an example.

A video audio input unit 1 inputs image and audio data to be reproduced. The video audio input unit 1 is an input terminal to input, for example, the image and audio data of digital broadcasting, or an optical drive for a DVD recording the image and audio data of a movie and the like.

A stream control unit 2 takes out the image and audio data input into the video audio input unit 1, and performs predetermined processing on the basis of an instruction from the outside. The stream control unit 2 performs the processing of image and audio data in accordance with, for example, the instructions of the reproduction, the fast-forward or the rewind of an image, and picture-in-picture, from a viewer.

A main video decoder 3 and a main audio decoder 4 decode the respective image data and audio data which a viewer instructs to display as a main picture. A sub video decoder 5 and a sub audio decoder 6 decode the respective image data and audio data which the viewer instructs to display as a sub picture, similarly.

A main high light detection unit 7 and a sub high light detection unit 8 detect high light scenes from the image and audio data of the main picture and the sub picture, respectively, by means of a predetermined high light detecting method. As the high light detecting method, the following methods can be cited.

(1) Volume detection: this method analyzes the volume of audio data to determine a high light scene when a volume of a predetermined level or more is being detected for a predetermined period or longer (detection method based on the volume of a sound). The method detects, for example, cheers of an audience and loud voices of an announcer in a sports image to determine a high light scene.

(2) Sound detection: this method analyzes audio frequencies of audio data to determine a high light scene when frequencies similar to a predetermined audio frequency are being detected for a predetermined period or longer (detection method based on an audio frequency characteristic). The method detects, for example, a high-pitched sound and a low-pitched sound of a singer in a music image to determine a high light scene.

(3) Movement detection: this method analyzes a motion vector of moving image data to determine a high light scene when the distribution quantity or the magnitude of a motion vector of a predetermined level or more is being detected for a predetermined period or longer (detection method based on the motion vector quantity of an image). The method detects, for example, a part in which the movement of a player becomes larger than the ordinary one in a sports image to determine a high light scene.

(4) People detection: this method analyzes the number of people from moving image data to determine a high light scene when a predetermined number or more of people is detected (detection method based on the number of people in a picture). The method detects, for example, a part in which all of the performers are gathered at the beginning of a television program to determine a high light scene.

The main high light detecting methods have been cited above, but the high light detecting methods of the present invention are not limited to the ones mentioned above.

The outputs of the main video decoder 3 and the main audio decoder 4 are output to a two-picture composition unit 9, and also the outputs of the sub video decoder 5 and the sub audio decoder 6 are similarly output to the two-picture composition unit 9. The two-picture composition unit 9 resizes the image data for main picture displaying and the image data for sub picture displaying to predetermined sizes, respectively, and composes two pictures by arranging the sub picture at a predetermined position in a display screen to perform picture-in-picture reproduction.

Moreover, the two-picture composition unit 9 performs a predetermined screen process on the basis of the results of the main high light detection unit 7 and the sub high light detection unit 8. The predetermined screen process means a screen process of informing a viewer of the occurrence of a high light scene of a sub picture when the high light scene is detected in the sub picture. The following methods may be included in the predetermined screen process.

(1) the method of increasing brightness of the frame of the sub picture, or blinking the frame, or changing the color of the frame to a predetermined color (that is, the method emphasizes the frame of the sub picture).

(2) the method of displaying a predetermined mark at a predetermined position in a main picture.

(3) the method of enlarging the picture size of the sub picture.

(4) the method of increasing the volume of the sub picture.

(5) the method of replacing the main picture with the sub picture.

A high light of a sub picture is informed to a viewer by the methods described above. Although the screen processing methods have been cited above, the screen processes of the present invention are not limited to those described above.

An output unit 10 is an output unit to a not illustrated display apparatus, and image and music data are transmitted to the display apparatus through the output unit 10. A plurality of moving images is displayed at the same time on the display screen of the display apparatus in a picture-in-picture display format including a main picture and a sub picture.

Figure 2A:
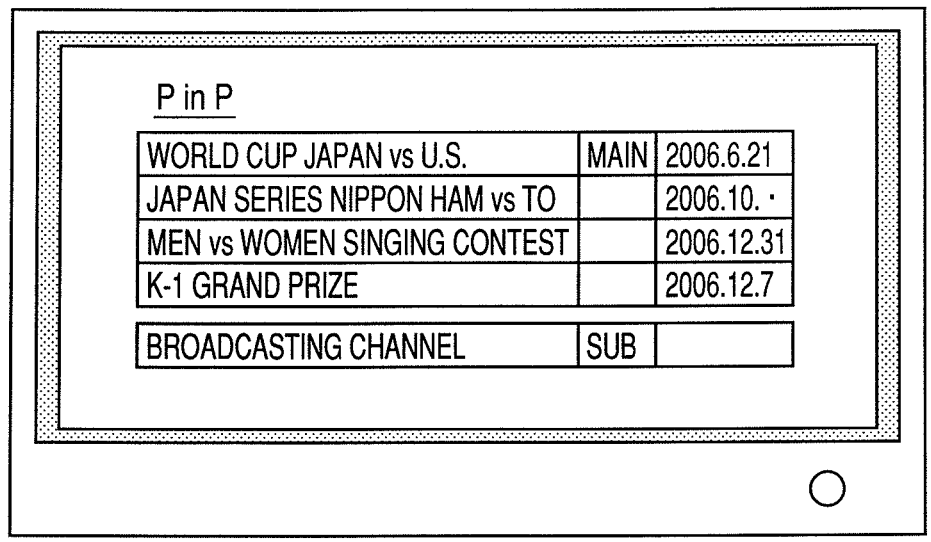
FIGS. 2A and 2B are views describing external operations of a first embodiment.
Figure 2B:
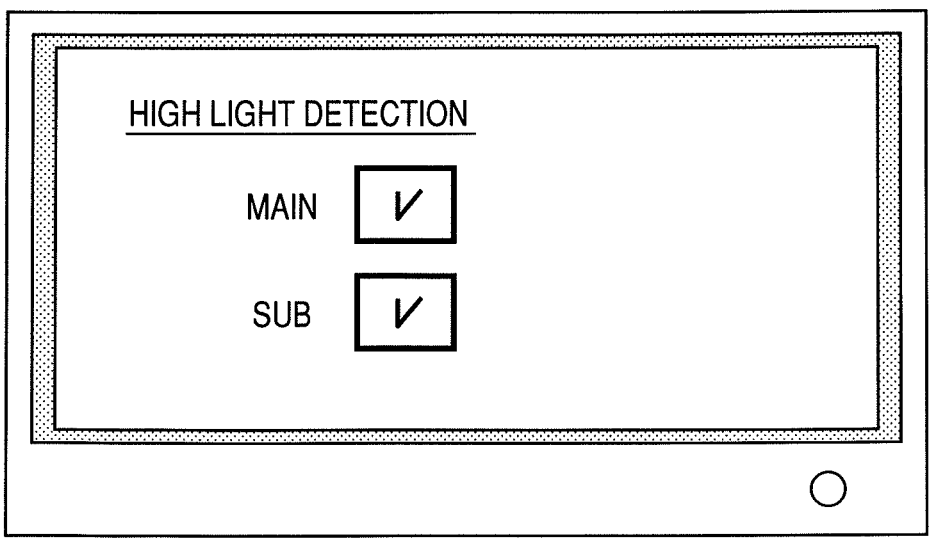

FIGS. 2A and 2B are explanatory diagrams of menu screen for performing the picture-in-picture reproduction. A viewer instructs the picture-in-picture reproduction in the screen shown in FIG. 2A. The viewer selects content or a channel to be displayed in each of a main picture and a sub picture from among recorded pieces of content and broadcasting channels. In FIG. 2A, the viewer specifies "WORLD CUP" to be displayed in the main picture from among four pieces of content that have previously been recorded.

A broadcasting channel is specified as the sub picture. That is, the viewer sets to look and listen to the recorded "WORLD CUP" as the main picture and a program that is being broadcasted in real time as the sub picture at the same time. After the setting, the screen is changed to the one illustrated in FIG. 2B, and then the viewer sets a picture to which high light detection is performed.

Here, if a viewer wants to set not to perform the above-mentioned predetermined screen process when high light scenes occur in each of the images displayed in the main picture and the sub picture at the same time, then the viewer sets to perform the high light detection in each of the main picture and the sub picture. In FIG. 2B, the viewer sets to perform the high light detection in each of the main picture and the sub picture.

Figure 3:
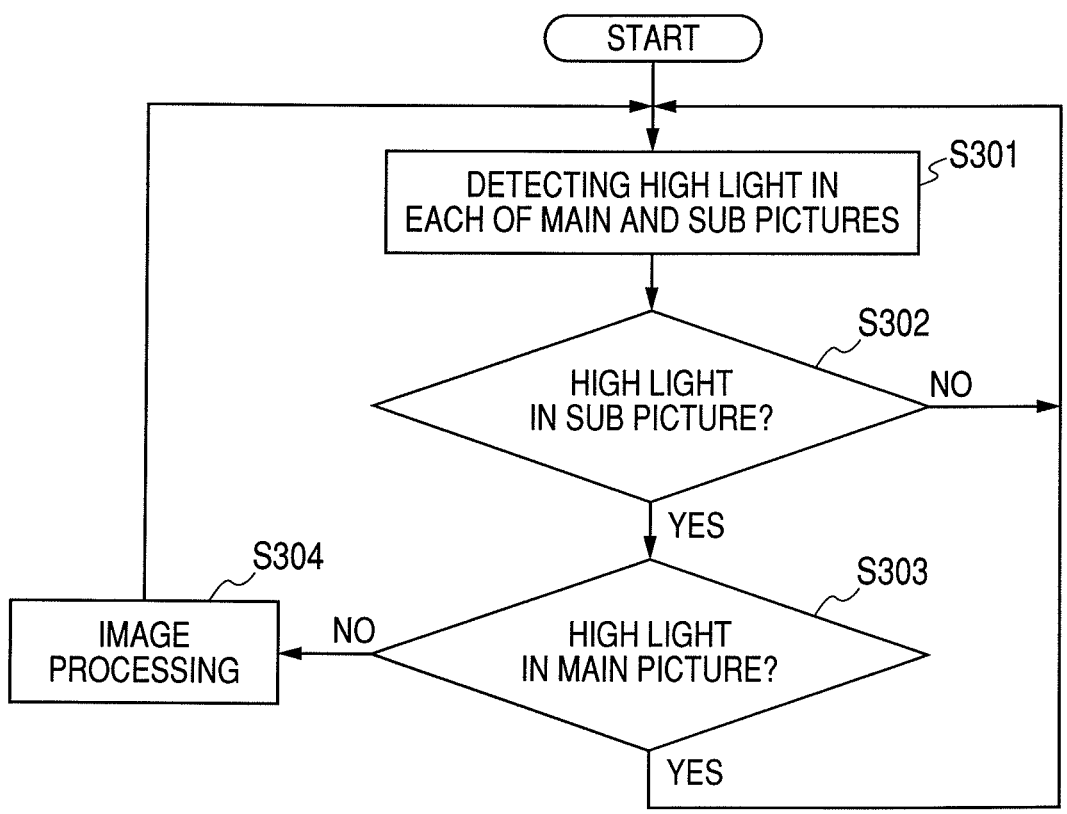
FIG. 3 is a flowchart describing the operation of the first embodiment.

FIG. 3 is a flowchart describing the operation of the present embodiment. In FIG. 3, the start stage is the state of starting the picture-in-picture reproduction. The main high light detection unit 7 and the sub high light detection unit 8 start high light detection in the images displayed respectively in the main picture and the sub picture from the time point when the picture-in-picture reproduction is started at Step S301. The results of the detection are transmitted to the two-picture composition unit 9 on occasion.

Next, the two-picture composition unit 9 receives the result of whether the image displayed in the sub picture is a high light scene or not from the sub high light detection unit 8 at Step S302. If the image is not the high light scene, then the processing returns to that at Step S301 again, and the high light detection of the images displayed respectively in of the main picture and the sub picture is successively performed. Consequently, the same picture-in-picture screen as that at the start of the picture-in-picture reproduction is still displayed.

If the two-picture composition unit 9 receives the result that the image displayed in the sub picture is a high light scene at Step S302, then the processing advances to that at Step S303. The two-picture composition unit 9 receives the result of whether the image displayed in the main picture is a high light scene or not from the main high light detection unit 7 at Step S303. If the main picture is not any high light scene here, the processing advances to that at Step S304, and the two-picture composition unit 9 performs the predetermined screen process as mentioned above. That is, the two-picture composition unit 9 performs the screen process of informing the viewer of the occurrence of the high light scene in the sub picture.

On the other hand, if the two-picture composition unit 9 receives the result that the image displayed in the main picture is a high light scene at Step S303, then the processing returns to that at Step S301 again, and the high light detection of the images displayed respectively in the main picture and the sub picture is successively performed. That is, if the image displayed in the main picture is also a high light scene when the image displayed in the sub picture is a high light scene, then the predetermined screen process as mentioned above is not performed.

The present invention relates to a moving image reproducing apparatus that superimposes a sub picture on a main picture to display a plurality of moving images at the same time as mentioned above. The present invention includes a unit for detecting high light scenes of images displayed in the main picture and the sub picture, and a unit for informing the occurrence of a high light scene of the image displayed in the sub picture; and if the image displayed in the main picture is also a high light scene when the image displayed in the sub picture is a high light scene, then the invention performs the control not to inform the occurrence of the high light scene of the image displayed in the sub picture.

Consequently, a viewer can look and listen to a high light scene displayed in the main picture without being troubled by unnecessary information.

Second Embodiment

Figure 4:
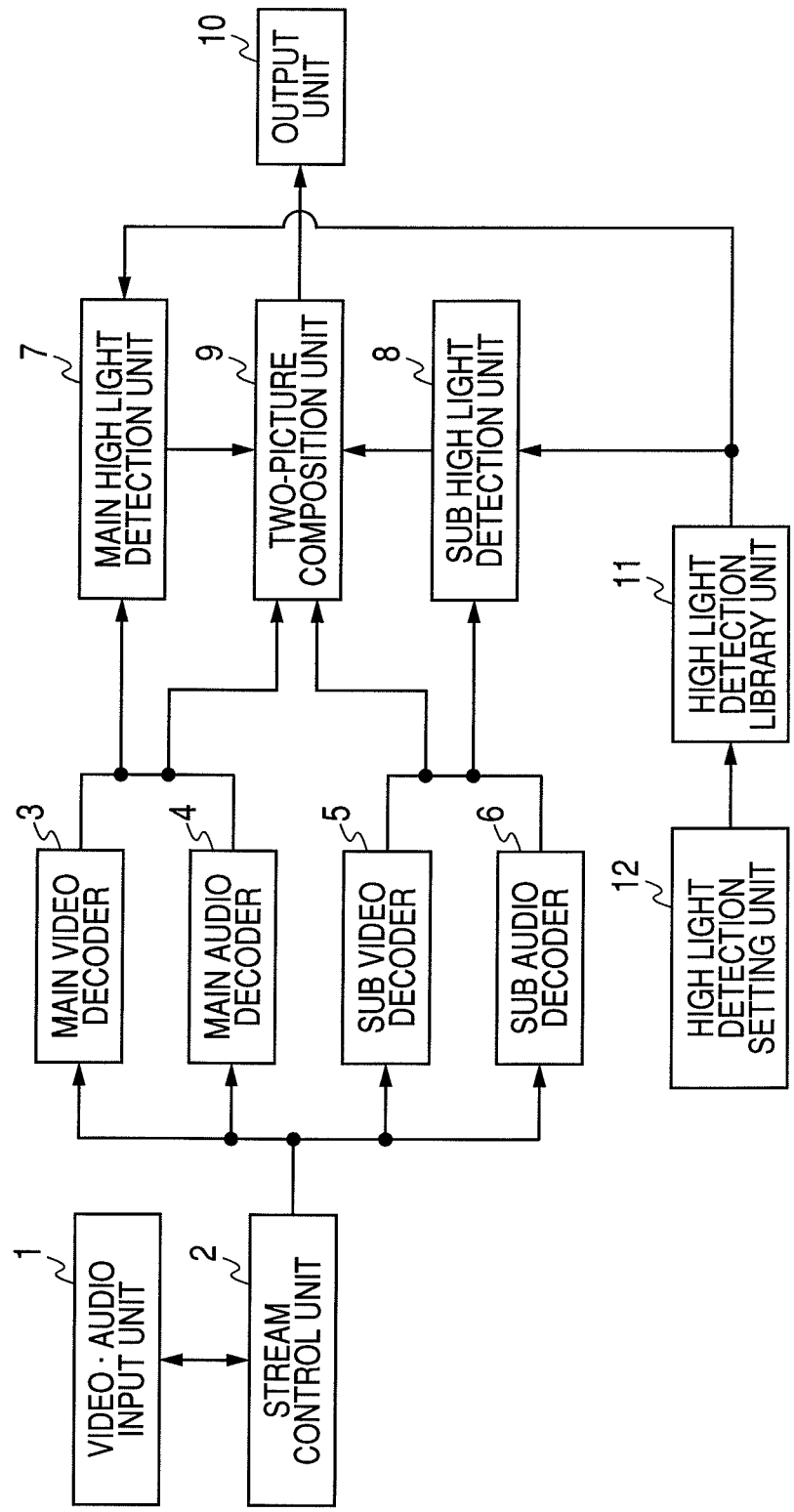
FIG. 4 is a block diagram illustrating a second embodiment of the present invention.

FIG. 4 is a block diagram illustrating a second embodiment of the present invention. In FIG. 4, the same parts as those in FIG. 1 are denoted by the same signs as those of FIG. 1, and the descriptions of the same parts are omitted. In FIG. 4, the different point from FIG. 1 is the addition of a high light detection library unit 11 and a high light detection setting unit 12.

The high light detection library unit 11 stores a plurality of high light detecting methods as mentioned above. The high light detection library unit 11 transmits the high light detecting methods set in the high light detection setting unit 12 to the main high light detection unit 7 and the sub high light detection unit 8, respectively. The main high light detection unit 7 and the sub high light detection unit 8 use the transmitted high light detecting methods to perform high light detection.

The high light detection setting unit 12 displays a menu to cause a viewer to set the detection methods of the main high light detection unit 7 and the sub high light detection unit 8. The high light detection setting unit 12 transmits an instruction set by means of the menu to the high light detection library unit 11 to select a detection method to be used from among the plurality of detection methods.

Figure 5A:
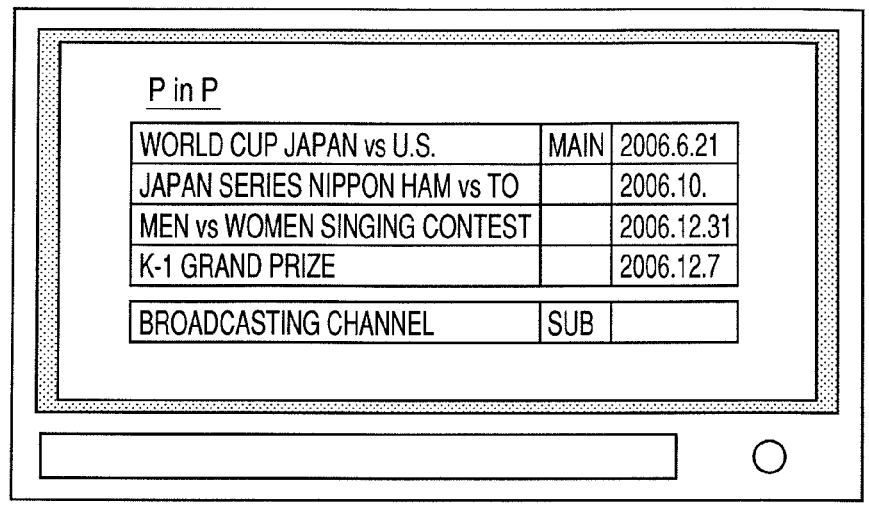
FIGS. 5A, 5B and 5C are views describing the external operations of the second embodiment.
Figure 5B:
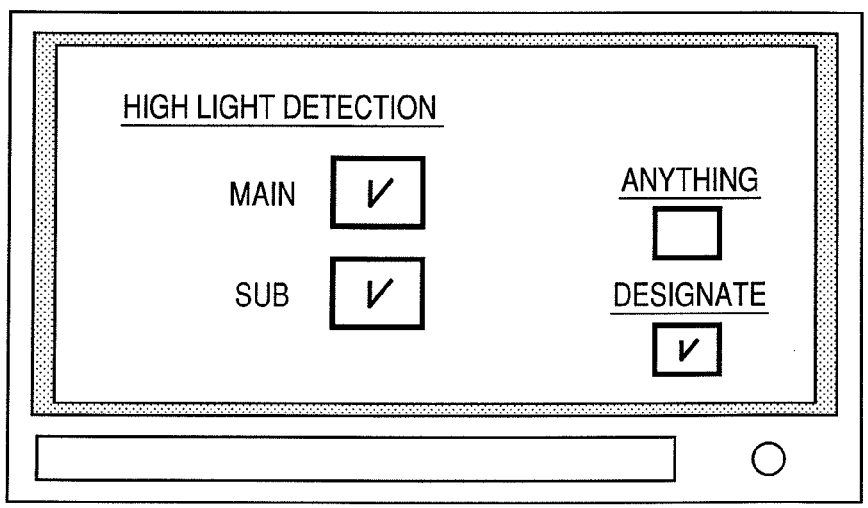
Figure 5C:
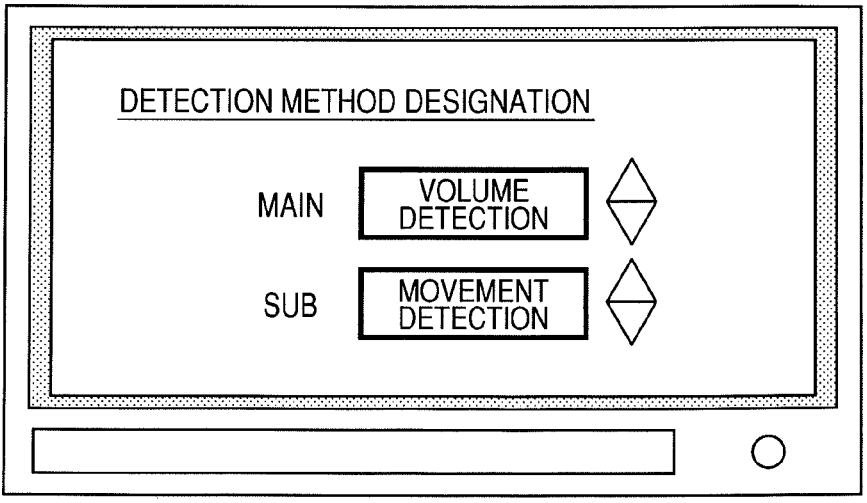

FIGS. 5A, 5B, and 5C are views for describing the menu screen for performing picture-in-picture reproduction. Because FIG. 5A displays the menu for the same operations as those of FIG. 2A, the description of FIG. 5A is omitted. The screen of FIG. 5B is for setting the picture to perform high light detection (main picture and sub picture) similarly to the screen of FIG. 2B. Moreover, the screen of FIG. 5B is for setting whether to use a high light detecting method set in advance in a reproduction apparatus or whether to use a high light detecting method that a viewer determines optionally.

That is, the items displayed on the lower right-hand side in the screen of FIG. 5B correspond to the setting items. The item "ANYTHING" corresponds to the former selection item, and the item "DESIGNATE" corresponds to the latter selection item. When a viewer selects the item "ANYTHING," the setting of the picture-in-picture function ends at the selection of the item in FIG. 5B. When the viewer selects the item "DESIGNATE," the screen is changed to the screen of FIG. 5C.

The viewer selects the high light detecting methods of the main picture and the sub picture in the screen of FIG. 5C. That is, the viewer selects one of the detection methods stored in the high light detection library unit 11 to each of the main picture and the sub picture in the window of FIG. 5C. FIG. 5C illustrates an example of the viewer's selection of the method of volume detection to the main picture and the method of movement detection to the sub picture.

FIG. 5C illustrates the menu in which only one method can be selected to each of the main picture and the sub picture, but a plurality of windows for selection may be provided to each of the main picture and the sub picture to enable the selection of a plurality of detection methods to each of the main picture and the sub picture. In that case, high light scenes are detected in the main picture and the sub picture by the plurality of detection methods, respectively.

Because the operation of the present embodiment is the same as that of FIG. 3, the detailed description thereof is omitted. As described above, the present embodiment enables a viewer to select the high light detecting methods to the sub picture and the main picture. Consequently, a user can set the suitable high light detecting methods to the main picture and the sub picture, respectively.

For example, the method of volume detection or movement detection may be better to be set to a sports program, and the method of sound detection may be better to be set to a musical program. Moreover, if high light scenes are detected in the main picture and the sub picture at the same time, then the predetermined screen process for informing a viewer of observing the sub picture is not performed similarly to the first embodiment.

As described above, even if a viewer selects a method among the plurality of high light detecting methods optionally, the same technological advantages as those of the first embodiment can be attained by the present embodiment.

Third Embodiment

Figure 6:
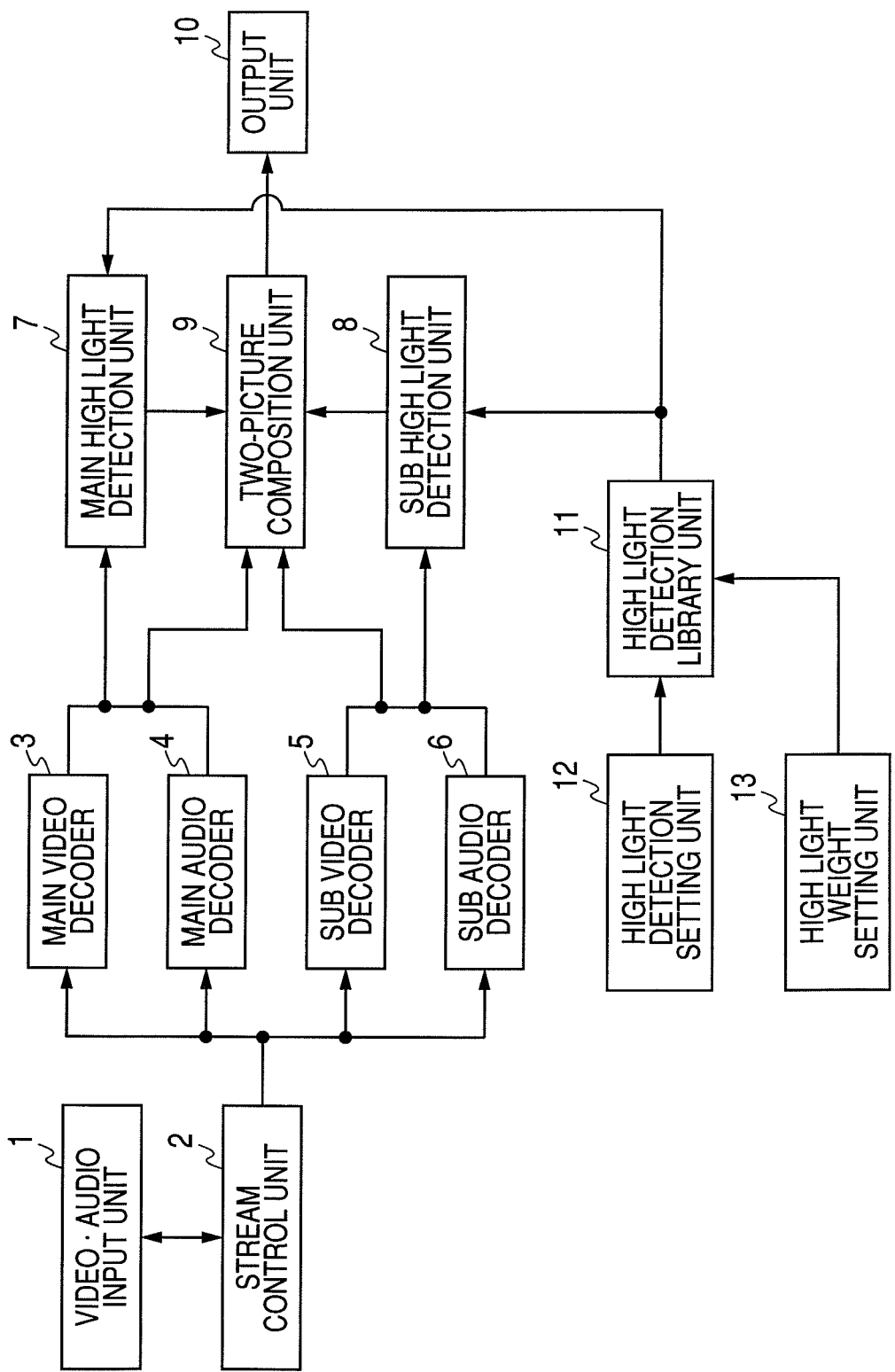
FIG. 6 is a block diagram illustrating a third embodiment of the present invention.

FIG. 6 is a block diagram illustrating a third embodiment of the present invention. In FIG. 6, the same parts as those of the second embodiment in FIG. 4 are denoted by the same signs, and their descriptions are omitted. The difference of the block diagram from that of FIG. 4 is the addition of a high light weight setting unit 13. In the present embodiment, a plurality of detection methods is set to each of the main picture and the sub picture, and a weight is set to each detection method.

The high light weight setting unit 13 displays a menu for setting weighting to a plurality of high light detecting methods stored in the high light detection library unit 11. Moreover, the high light weight setting unit 13 transmits the instructions set in the menu to the high light detection library unit 11 to perform the weighting of the detection methods.

Figure 7:
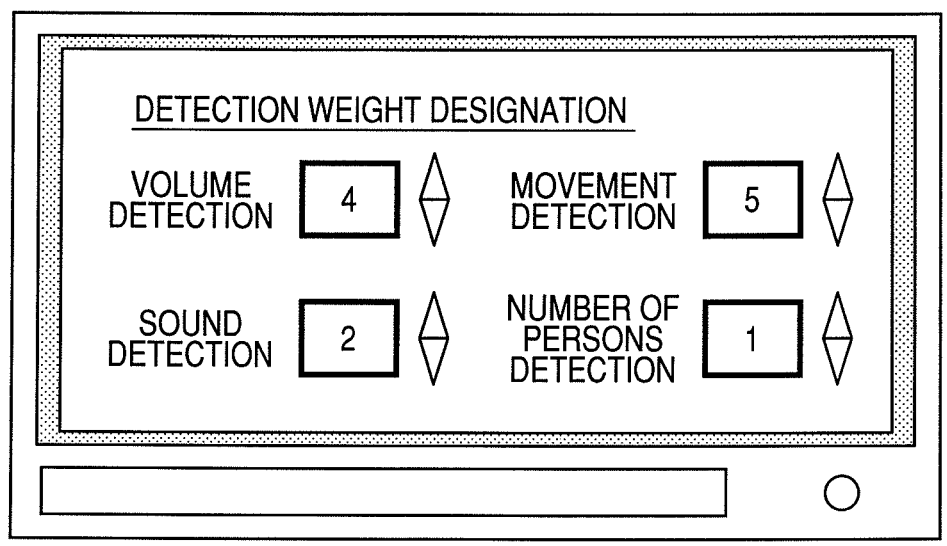
FIG. 7 is a view describing the external operations of the third embodiment.

FIG. 7 is an explanatory diagram of a menu picture for setting high light weights. In the menu screen of FIG. 7, all of the plurality of high light detecting methods stored in the high light detection library unit 11 is displayed. Then, weighting can be performed to each of the detection methods. The weight means a degree of importance.

In FIG. 7, the methods of "VOLUME DETECTION," "MOVEMENT DETECTION," "SOUND DETECTION," and "PEOPLE DETECTION" are displayed as the plurality of detection methods. A window is displayed on the right-hand side of each of the detection methods, and the weights of from one to five can be set to each of the detection methods. The weight 5 is supposed to have the largest degree of importance, and the weights 4, 3, 2, and 1 are supposed to have the smaller degrees of importance in the order.

For example, it is supposed here that the methods of the volume detection and the people detection are set to the main picture, and that the methods of the movement detection and the sound detection are set to the sub picture. Moreover, it is supposed that the weights 4 and 1 are set to the methods of the volume detection and the people detection of the main picture, respectively, and that the weights 5 and 2 are set to the movement detection and the sound detection of the sub picture, respectively. Incidentally, high light scenes are detected by the plurality of detection methods set to both of the main picture and the sub picture.

Figure 8:
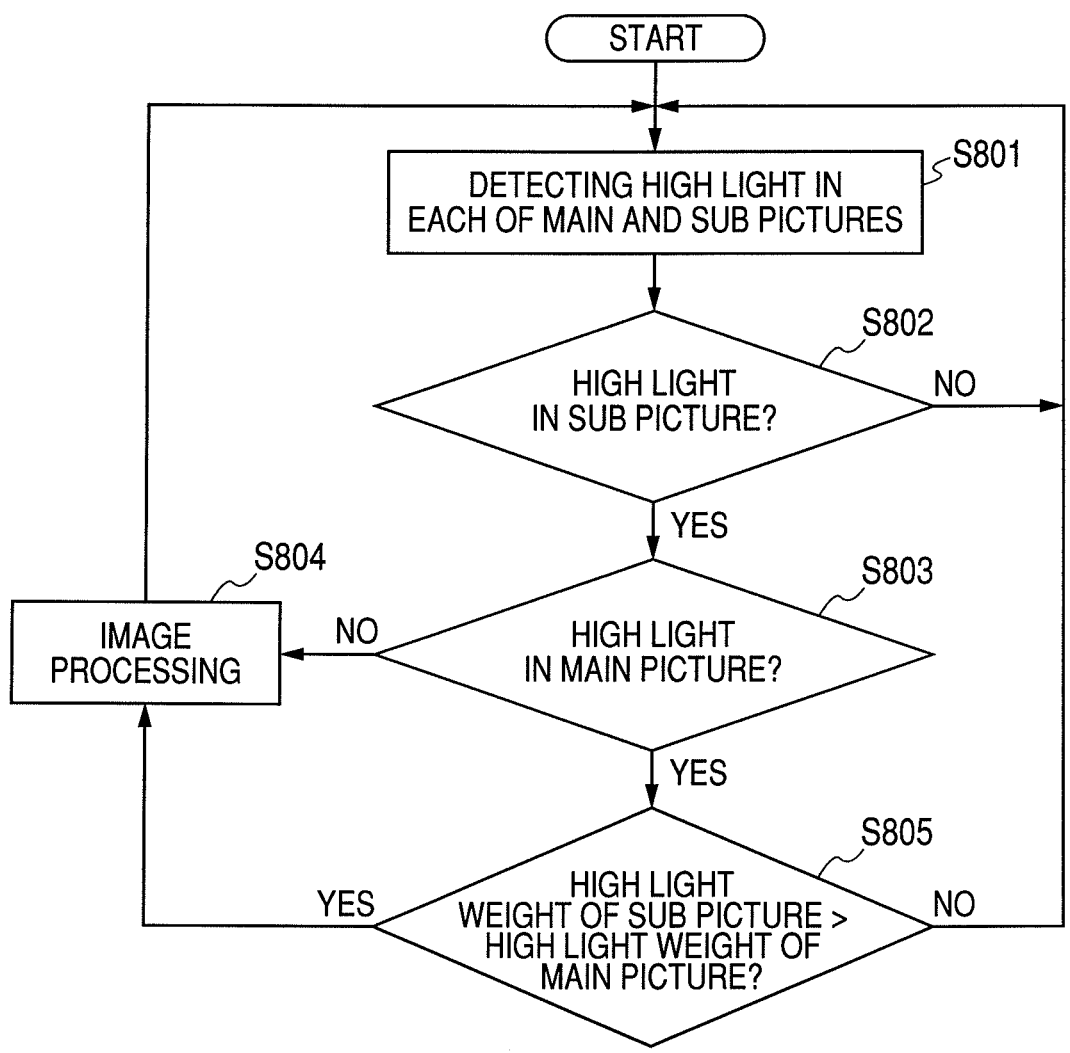
FIG. 8 is a flowchart describing the operation of the third embodiment.

FIG. 8 is a flowchart describing the operation of the present embodiment. Incidentally, because the processing from Step S801 to Step S804 are the same as those from Step S301 to Step S304 of FIG. 3, their descriptions are omitted. If the two-picture composition unit 9 receives the result that the image displayed in the main picture is a high light scene at Step S803, then the processing advances to that at Step S805, and the weight of the high light detecting method of the sub picture is compared with the weight of the high light detecting method of the main picture, both weights being set in the high light weight setting unit 13.

That is, if the images displayed respectively in the main picture and the sub picture are detected as high light scenes, then the weight of the detection method by which the high light scene has been detected in the main picture and the weight of the detection method by which the high light scene has been detected in the sub picture are compared with each other. At that time, the weights of the detection methods by which the high light scenes have been detected by the main high light detection unit 7 and the sub high light detection unit 8 are informed to a not illustrated control circuit from the main high light detection unit 7 and the sub high light detection unit 8, respectively, and the control circuit compares the informed weights.

At this time, if the weight of the detection method of the sub picture is larger, then the processing advances to that at Step S804, and the two-picture composition unit 9 performs the predetermined screen process as mentioned above. If the weight of the main picture is equal to or larger than that of the sub picture, then the processing returns to that at Step S801 again, and the high light detection of the main picture and the sub picture is successively performed.

That the weight of the sub picture is larger than that of the main picture means, for example, that a high light scene is detected by the method of the volume detection (weight 4) in the main picture (Step 803) and a high light scene is detected by the method of the movement detection (weight 5) in the sub picture (Step S802) here. That is, the user has set the most important weight 5 to the method of the movement detection of the sub picture, and the high light scene in the sub picture is informed when the high light scene is detected by the detection method based on the motion quantity, which is the feature of the movement detection of the sub picture.

On the other hand, the weight 2 is set to the method of the sound detection, which is another method set to the sub picture. If a high light scene is detected in the sub picture by the method of the sound detection, then the high light scene in the sub picture is not informed. That is, the user suppresses the frequency of the information of high light scenes in the sub picture if the high light scenes are detected by the method of the sound detection by setting a lower degree of importance to the method of the sound detection.

In order to detect the optimum high light scene in the sub picture and the main picture, the present embodiment sets the weights to a plurality of detection methods if the detection methods are optionally set. Thereby, if the images displayed respectively in the main picture and the sub picture are detected to be high light scenes, then it can be set optionally according to the weights whether to inform the occurrence of the high light scene in the image displayed in the sub picture or not.

Fourth Embodiment

Figure 9:
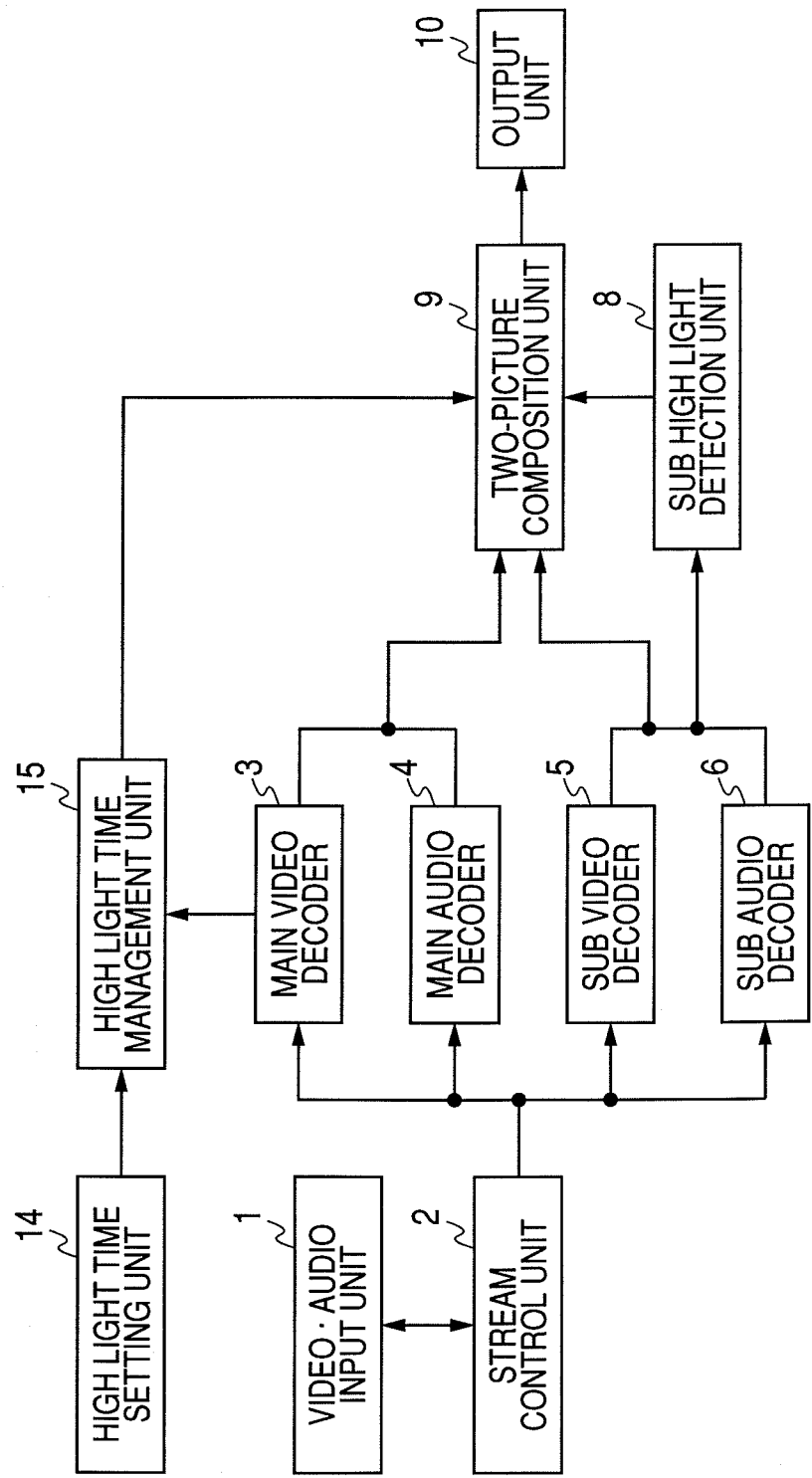
FIG. 9 is a block diagram illustrating a fourth embodiment of the present invention.

FIG. 9 is a block diagram illustrating a fourth embodiment of the present invention. In FIG. 9, the same parts as those of FIG. 1 are denoted by the same signs as those of FIG. 1, and their descriptions are omitted. Because the main high light detection unit 7 is unnecessary for the present embodiment, the main high light detection unit 7 is not incorporated in the configuration of the present embodiment. Moreover, a high light time setting unit 14 and a high light time management unit 15 are added to the configuration of FIG. 1.

The high light time setting unit 14 displays a menu so that a viewer can set the starting time and the ending time of high light to a stream recorded in advance. The starting time and the ending time of the high light set here are transmitted to the high light time management unit 15.

The high light time management unit 15 records and manages the starting time and the ending time set to each stream. That is, the high light of the main picture of the present embodiment is set to a time zone managed by the high light time management unit 15 as the high light. Then, the high light time management unit 15 receives the content information reproduced by the main video decoder 3, and selects the high light time zone set to the content. The high light time management unit 15 transmits the selected high light time zone, that is, the starting time and the ending time of the high light scene, to the two-picture composition unit 9.

The operation of the present embodiment is the same as that of FIG. 3. If a high light scene occurs in the sub picture, the predetermined screen process of informing the occurrence of the high light scene in the sub picture is performed, as described above. Moreover, the two-picture composition unit 9 determines the existence of a high light scene in the main picture on the basis of the transmitted high light time zone. If the high light detection of the main picture overlaps with the high light detection of the sub picture, the two-picture composition unit 9 does not perform the predetermined image processing, similarly to the first embodiment.

Because the time zone of the high light of the main picture is manually set in the present embodiment, a viewer can surely set the scene that the viewer wants to see in the main picture. Moreover, if high light scenes occur in the main picture and the sub picture at the same time, the predetermined screen process of the information of viewing the sub picture is not similarly performed.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-188205, filed Jul. 19, 2007, which is hereby incorporated by reference herein in its entirety.

What is claimed is:

1. A moving image reproducing apparatus capable of displaying a plurality of moving images on a display screen including a main picture and a sub picture, the apparatus comprising:
   a detector to detect a predetermined scene from images displayed respectively in the main picture and the sub picture;
   a setter to set whether to execute the detection of the predetermined scene from the images displayed respectively in the main picture and the sub picture or not; and
   a composer to compose the image for main picture and the image for sub picture to display the composed image, and to inform a viewer of occurrence of the predetermined scene in the sub picture,
   wherein in a case that the detector detects the predetermined scene from an image displayed in the sub picture and does not detect the predetermined scene from an image displayed in the main picture, then the composer informs the viewer of occurrence of the predetermined scene in the sub picture, and
   wherein in a case that the detector detects the predetermined scene from both the images displayed in the main picture and the sub picture, then the composer does not inform the viewer through audio and image processing of respective occurrences of the predetermined scenes of the images displayed in the main picture and the sub picture.

2. A moving image reproducing apparatus capable of displaying a plurality of moving images on a display screen including a main picture and a sub picture, the apparatus comprising:
   a setter to select a detection method of predetermined scenes of the images displayed respectively in the main picture and the sub picture from among a plurality of detection methods to set a plurality of selected detection methods as the detection methods of the predetermined scenes of the respective main picture and sub picture, the setter being arranged to set a degree of importance for predetermined scene detection to each of the plurality of detection methods set to the respective main picture and sub picture; and
   a composer to compose the image for main picture and the image for sub picture to display the composed image, and to inform a viewer of occurrence of the predetermined scene in the sub picture,
   wherein in a case that the image displayed in the sub picture is the predetermined scene and the image displayed in the main picture is not the predetermined scene, then the composer informs the viewer of occurrence of the predetermined scene in the sub picture, and
   wherein in a case that the image displayed in the main picture and the image displayed in the sub picture are both the predetermined scenes, then the composer compares (a) a degree of importance set to the detection method which is set to the main picture and which detects the image displayed in the main picture as the predetermined scene with (b) a degree of importance set to the detection method which is set to the sub picture and which detects the image displayed in the sub picture as the predetermined scene, and does not inform the viewer through audio and image processing that the predetermined scene occurs in the main picture and the predetermined scene occurs in the sub picture, in a case that the degree of importance corresponding to the main picture is higher than the degree of importance corresponding to the sub picture.

3. A control method of a moving image reproducing apparatus capable of displaying a plurality of moving images on a display screen including a main picture and a sub picture, the method comprising the steps of:
   detecting a predetermined scene from images displayed respectively in the main picture and the sub picture;
   setting whether to execute the detecting of the predetermined scene from the images displayed respectively in the main picture and the sub picture or not; and
   composing the image for main picture and the image for sub picture to display the composed image, and informing a viewer of occurrence of the predetermined scene in the sub picture,
   wherein in a case that the detecting step detects the predetermined scene from an image displayed in the sub picture and does not detect the predetermined scene from an image displayed in the main picture, then the composing step informs the viewer of occurrence of the predetermined scene in the sub picture, and
   wherein in a case that the detecting step detects the predetermined scene from both the images displayed in the main picture and the sub picture, then the composing step does not inform the viewer through audio and image processing of respective occurrences of the predetermined scenes in the main picture and the sub picture.

4. A control method of a moving image reproducing apparatus capable of displaying a plurality of moving images on a display screen including a main picture and a sub picture, the method comprising the steps of:
   selecting a detection method of predetermined scenes of the images displayed respectively in the main picture and the sub picture from among a plurality of detection methods to set a plurality of selected detection methods as the detection methods of the predetermined scenes of the respective main picture and sub picture, the setting step being arranged to set a degree of importance for predetermined scene detection to each of the plurality of detection methods set to the respective main picture and sub picture; and
   composing the image for main picture and the image for sub picture to display the composed image, and informing a viewer of occurrence of the predetermined scene in the sub picture,
   wherein in a case that the image displayed in the sub picture is the predetermined scene and the image displayed in the main picture is not the predetermined scene, then the composing step informs the viewer of occurrence of the predetermined scene in the sub picture, and
   wherein in a case that the image displayed in the main picture and the image displayed in the sub picture are both the predetermined scenes, then the composing step compares (a) a degree of importance set to the detection method which is set to the main picture and which detects the image displayed in the main picture as the predetermined scene with (b) a degree of importance set to the detection method which is set to the sub picture and which detects the image displayed in the sub picture as the predetermined scene, and does not inform the viewer through audio and image processing that the predetermined scene occurs in the main picture and the predetermined scene occurs in the sub picture in a case that the degree of importance corresponding to the main picture is higher than the degree of importance corresponding to the sub picture.

5. An image processing apparatus comprising:
   a detector to detect predetermined scenes respectively from a first moving image and a second moving image; and
   a composer to generate a display screen including a first picture in which the first moving image is displayed and a second picture in which the second moving image is displayed and to output the display screen to a display device,
   wherein the composer displays, on the display screen, predetermined information representing that the second moving image of the predetermined scene is displayed in the second picture, in accordance with a detection result by the detector,
   wherein the composer displays the predetermined information in a case that the predetermined scene is not detected by the detector from the first moving image displayed in the first picture and the predetermined scene is detected by the detecting unit from the second moving image displayed in the second picture, and
   wherein the composer generates the display screen so as not to indicate thereon through audio and image processing that images of the predetermined scenes are displayed respectively on the first picture and the second picture in a case that the predetermined scenes are detected by the detector from both the first moving image displayed in the first picture and the second moving image displayed in the second picture.

6. The moving image reproducing apparatus according to claim 1, wherein the detector is arranged to perform at least one of
   (a) a processing of analyzing audio volume of audio data and detecting, as the predetermined scene, a scene from which the volume greater than a predetermined level is detected for a predetermined time period,
   (b) a processing of analyzing audio frequencies of the audio data and detecting, as the predetermined scene, a scene from which a frequency similar to a predetermined frequency is detected for the predetermined time period,
   (c) a processing of analyzing a motion vector of moving image data and detecting, as the predetermined scene, a scene from which a distribution amount or size of the motion vector greater than a predetermined level is detected for the predetermined time period, and
   (d) a processing of analyzing a number of persons in the moving image data and detecting, as the predetermined scene, a scene from which more than a predetermined number of persons are detected for the predetermined time period.

7. The moving image reproducing apparatus according to claim 1, wherein as to at least one of the main picture and the sub picture, the detector detects the predetermined scene by using a detection method which the viewer designates in advance.

8. The moving image reproducing apparatus according to claim 1, wherein the composer informs the viewer of occurrence of the predetermined scene in the sub picture by performing at least one of a plurality of image processings including increasing brightness of the frame of the sub picture, displaying the frame of the sub picture in a blinking manner, changing a color of the frame of the sub picture to a predetermined color, displaying a predetermined mark at a predetermined position in the main picture, enlarging a size of the sub picture, turning up the volume of the sub picture, and transposing the main picture and the sub picture.

9. The moving image reproducing apparatus according to claim 2, wherein the setter is arranged to perform at least one of
(a) a processing of analyzing audio volume of audio data and detecting, as the predetermined scene, a scene from which the volume greater than a predetermined level is detected for a predetermined time period,
(b) a processing of analyzing audio frequencies of the audio data and detecting, as the predetermined scene, a scene from which a frequency similar to a predetermined frequency is detected for the predetermined time period,
(c) a processing of analyzing a motion vector of moving image data and detecting, as the predetermined scene, a scene from which a distribution amount or size of the motion vector greater than a predetermined level is detected for the predetermined time period, and
(d) a processing of analyzing a number of persons in the moving image data and detecting, as the predetermined scene, a scene from which more than a predetermined number of persons are detected for the predetermined time period.

10. The moving image reproducing apparatus according to claim 2, wherein in a case that the degree of importance of the predetermined scene set to the detection method which is set to the sub picture is higher than that set to the detection method which is set to the main picture, the composer informs the viewer of occurrence of the predetermined scene in the sub picture.

11. The moving image reproducing apparatus according to claim 2, wherein the composer informs the viewer of occurrence of the predetermined scene in the sub picture by performing at least one of a plurality of image processings including increasing brightness of the frame of the sub picture, displaying the frame of the sub picture in a blinking manner, changing a color of the frame of the sub picture to a predetermined color, displaying a predetermined mark at a predetermined position in the main picture, enlarging a size of the sub picture, turning up the volume of the sub picture, and transposing the main picture and the sub picture.

12. The control method of the moving image reproducing apparatus according to claim 3, wherein the detecting step is arranged to perform at least one of
(a) a processing of analyzing audio volume of audio data and detecting, as the predetermined scene, a scene from which the volume greater than a predetermined level is detected for a predetermined time period,
(b) a processing of analyzing audio frequencies of the audio data and detecting, as the predetermined scene, a scene from which a frequency similar to a predetermined frequency is detected for the predetermined time period,
(c) a processing of analyzing a motion vector of moving image data and detecting, as the predetermined scene, a scene from which a distribution amount or size of the motion vector greater than a predetermined level is detected for the predetermined time period, and
(d) a processing of analyzing a number of persons in the moving image data and detecting, as the predetermined scene, a scene from which more than a predetermined number of persons are detected for the predetermined time period.

13. The control method of the moving image reproducing apparatus according to claim 3, wherein as to at least one of the main picture and the sub picture, the detecting step detects the predetermined scene by using a detection method which the viewer designates in advance.

14. The control method of the moving image reproducing apparatus according to claim 3, wherein the composing step informs the viewer of occurrence of the predetermined scene in the sub picture by performing at least one of a plurality of image processings including increasing brightness of the frame of the sub picture, displaying the frame of the sub picture in a blinking manner, changing a color of the frame of the sub picture to a predetermined color, displaying a predetermined mark at a predetermined position in the main picture, enlarging a size of the sub picture, turning up the volume of the sub picture, and transposing the main picture and the sub picture.

15. The control method of the moving image reproducing apparatus according to claim 4, wherein the selecting step is arranged to perform at least one of
(a) a processing of analyzing audio volume of audio data and detecting, as the predetermined scene, a scene from which the volume greater than a predetermined level is detected for a predetermined time period,
(b) a processing of analyzing audio frequencies of the audio data and detecting, as the predetermined scene, a scene from which a frequency similar to a predetermined frequency is detected for the predetermined time period,
(c) a processing of analyzing a motion vector of moving image data and detecting, as the predetermined scene, a scene from which a distribution amount or size of the motion vector greater than a predetermined level is detected for the predetermined time period, and
(d) a processing of analyzing a number of persons in the moving image data and detecting, as the predetermined scene, a scene from which more than a predetermined number of persons are detected for the predetermined time period.

16. The control method of the moving image reproducing apparatus according to claim 4, wherein in a case that the degree of importance of the predetermined scene set to the detection method which is set to the sub picture is higher than that set to the detection method which is set to the main picture, the composing step informs the viewer of occurrence of the predetermined scene in the sub picture.

17. The control method of the moving image reproducing apparatus according to claim 4, wherein the composing step informs the viewer of occurrence of the predetermined scene in the sub picture by performing at least one of a plurality of image processings including increasing brightness of the frame of the sub picture, displaying the frame of the sub picture in a blinking manner, changing a color of the frame of the sub picture to a predetermined color, displaying a predetermined mark at a predetermined position in the main picture, enlarging a size of the sub picture, turning up the volume of the sub picture, and transposing the main picture and the sub picture.

18. The image processing apparatus according to claim 5, wherein the detector is arranged to perform at least one of
(a) a processing of analyzing audio volume of audio data and detecting, as the predetermined scene, a scene from which the volume greater than a predetermined level is detected for a predetermined time period,
(b) a processing of analyzing audio frequencies of the audio data and detecting, as the predetermined scene, a scene from which a frequency similar to a predetermined frequency is detected for the predetermined time period, (c) a processing of analyzing a motion vector of moving image data and detecting, as the predetermined scene, a scene from which a distribution amount or size of the motion vector greater than a predetermined level is detected for the predetermined time period, and (d) a processing of analyzing a number of persons in the moving image data and detecting, as the predetermined scene, a scene from which more than a predetermined number of persons are detected for the predetermined time period.

19. The image processing apparatus according to claim 5, wherein as to at least one of the first picture and the second picture, the detector detects the predetermined scene by using a detection method which the viewer designates in advance.

20. The image processing apparatus according to claim 5, wherein the composer informs the viewer of occurrence of the predetermined scene in the second picture by performing at least one of a plurality of image processings including increasing brightness of the frame of the second picture, displaying the frame of the second picture in a blinking manner, changing a color of the frame of the second picture to a predetermined color, displaying a predetermined mark at a predetermined position in the first picture, enlarging a size of the second picture, turning up the volume of the second picture, and transposing the first picture and the second picture.

* * * * *